United States Patent [19]

Enari et al.

[11] Patent Number: 4,888,753
[45] Date of Patent: Dec. 19, 1989

[54] INFORMATION RECORDING MEDIUM CAPABLE OF ACCURATELY DETECTING THE RECORDING AND REPRODUCTION STARTING POSITIONS AND AN INFORMATION RECORDING-REPRODUCING METHOD AND APPARATUS THEREFOR

[75] Inventors: Masahiko Enari, Yokohama; Akio Aoki, Tokyo; Machiko Matsushita, Yokohama; Hiroshi Matsuoka, Kawasaki; Kazuo Minoura, Yokohama, all of Japan

[73] Assignee: Canon Kabushiki Kaisha, Tokyo, Japan

[21] Appl. No.: 870,528

[22] Filed: Jun. 4, 1986

[30] Foreign Application Priority Data

Jun. 5, 1985 [JP] Japan ................................ 60-122186
Oct. 18, 1985 [JP] Japan ................................ 60-231386

[51] Int. Cl.$^4$ .............................................. G11B 7/00
[52] U.S. Cl. .......................................... 369/44; 369/32; 369/47; 365/215

[58] Field of Search .................... 369/32, 44, 45, 59, 369/48, 47, 53, 58, 111, 124; 365/215; 371/10; 360/78.01

[56] References Cited

U.S. PATENT DOCUMENTS

| 4,433,403 | 2/1984 | Baba et al. ............................ 369/48 |
| 4,443,870 | 4/1984 | Hazel et al. .......................... 369/44 |
| 4,611,314 | 9/1986 | Ogata et al. .......................... 369/48 |

Primary Examiner—William M. Shoop, Jr.
Assistant Examiner—Brian K. Young
Attorney, Agent, or Firm—Fitzpatrick, Cella, Harper & Scinto

[57] ABSTRACT

In an information recording medium according to the present invention, marks for discriminating between information tracks and a mark indicative of the information concerning spacing from a position at which each of the marks is provided to the recording starting position are provided in an information block, and a plurality of such information blocks are continuously provided in the other area of the information tracks than the recording area. The specification also discloses an information recording and reproducing method and apparatus utilizing such a plurality of information blocks.

26 Claims, 5 Drawing Sheets

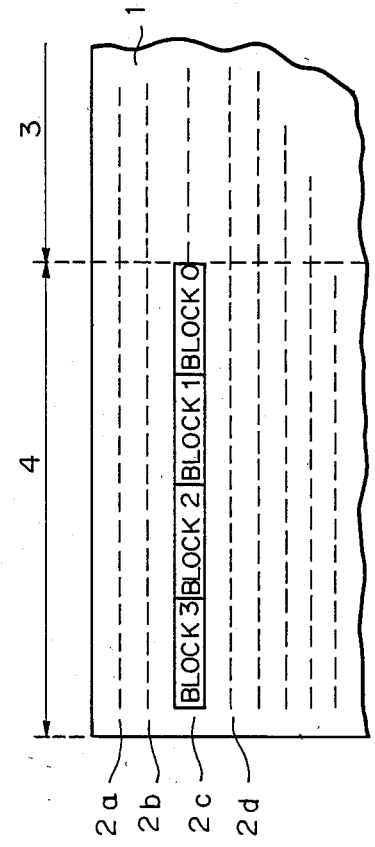
Fig. 1
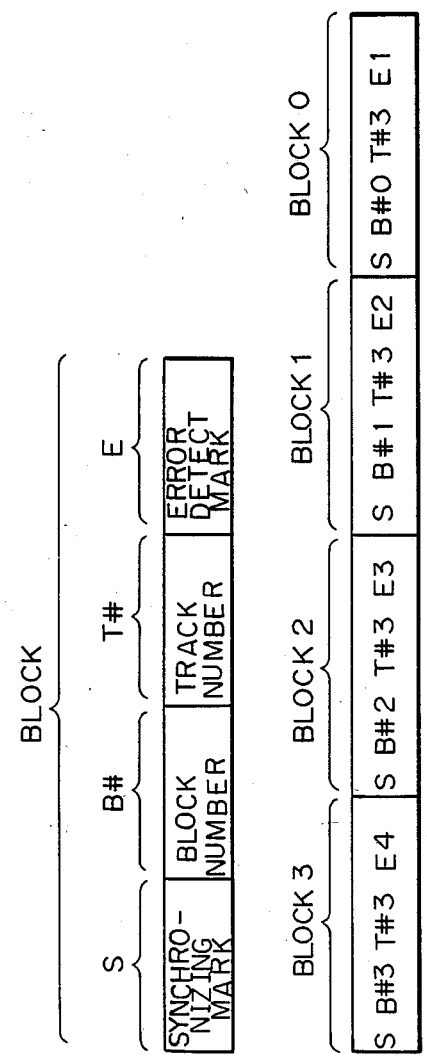
Fig.2A
Fig.2B

INFORMATION RECORDING MEDIUM CAPABLE OF ACCURATELY DETECTING THE RECORDING AND REPRODUCTION STARTING POSITIONS AND AN INFORMATION RECORDING-REPRODUCING METHOD AND APPARATUS THEREFOR

BACKGROUND AND SUMMARY OF THE INVENTION

This invention relates to an information recording medium adapted to be capable of accurately detecting the recording and/or reproduction starting position and to an information recording-reproducing method and apparatus therefor.

It is well known to record information on a recording medium having a plurality of information tracks by the use of magnetism, a light beam or the like. A disc-like shape, a card-like shape, a tape-like shape, etc. are known as the shapes of such recording medium.

Now, when information is to be recorded on the information tracks of such medium with a light beam or a magnetic flux being stopped down by an optical head or a magnetic head, to record the information on a desired track, it is necessary to confirm whether the track is the desired track before the recording operation. One method was to pre-record a track number on that area of the track on which the information is to be recorded (hereinafter referred to as the requisite recording area) by some modulation system (for example, the FM modulation system), read this track number and thereby confirm the track.

Particularly as regards the track number, the assignee of the present invention filed an application which covers an embodiment in which the same information, i.e., the track number, is repetitively recorded with the fact being taken into account that reproduction cannot be accomplished because of dust or injury on the recording medium.

So, it becomes necessary to confirm the position at which recording of the track is started, that is, the first position of the recording area, after the desired track could be confirmed by said means. However, where a plurality of identical track numbers are continuously provided for one track as described above, depending on the position at which the track number that could be confirmed is provided, the distance from the position at which that track was confirmed to the first position of the requisite recording area is determined. In other words, the position at which the track number can be confirmed is not always a fixed position and therefor, the distance from the position at which the track was confirmed to the first position of writing is not always constant. Accordingly, again in such a case, it is desired that the recording starting position can be accurately detected.

Next, again in a case where information recorded in the recording area is to be reproduced, it is desired that the reproduction starting position be known accurately. So, it would occur to one to record a synchronizing mark before the information of the recording track, and repetitively record the synchronizing mark with a case taken into account where the synchronizing mark cannot be reproduced because of injury or the like. Again in this case, however, the distance from the point at which the synchronizing mark is detected to the reproduction starting position is not always constant and therefore, it would occur to one to include means such as caption code in the information and recognize the reproduction starting position. In this case, the presence or absence of a detection error is determined by whether the caption code is properly recognized, and it is difficult to know the reproduction starting position at stable accuracy.

It is therefore a first object of the present invention to provide an information recording medium on which a plurality of marks for discriminating between information tracks, such as track numbers, are continuously provided in the other area of the information tracks than the requisite recording area and in which the information recording starting position can be accurately detected without any error.

In the information recording meidum according to the present invention, at least marks for discriminating between information tracks and a mark indicative of the information from a position at which each of the marks is provided to the recording starting position are provided in an information block, and a plurality of such information blocks are continuously provided in the other area of the information tracks than the requisite recording area. Therefore, in whatever information block the information track is confirmed, the information from that position to the recording starting position is read at a time and thus, recording can be accomplished at an accurate position.

In this case, if the construction is such that even during reproduction of the record, the reproduction of the portion in which the information block is included is effected, accurate detection of the reproduction starting position also becomes possible by this information block.

It is a second object of the present invention to provide an information recording-reproducing method and apparatus for accurately recording and/or reproducing information by the use of such an information recording medium.

It is a third object of the present invention to provide an information recording-reproducing method and apparatus in which during recording, information for discriminating the reproduction starting position is recorded on a recording track and during reproduction, the reproduction starting position can be accurately detected by the discriminating information.

It is a fourth object of the present invention to provide an information recording-reproducing method and apparatus in which when use is made of an information recording medium on which is pre-recorded position discriminating information having information indicative of the recording starting position, even if this prerecorded position discriminating information is not reproduced during the reproduction of the record, the same position discriminating information as said position discriminating information, together with the recording information, is recorded on a recording track during information recording, and during reproduction also, the reproduction starting position can be accurately detected by the position discriminating information recorded on said recording track.

BRIEF DESCRIPTION OF THE DRAWINGS

FIG. 1 is a fragmentary view of an example of the information recording medium according to the present invention.

FIG. 2A shows information blocks.

FIG. 2B shows an example of the position descriminating information.

DESCRIPTION OF THE PREFERRED EMBODIMENTS

Figure 3:
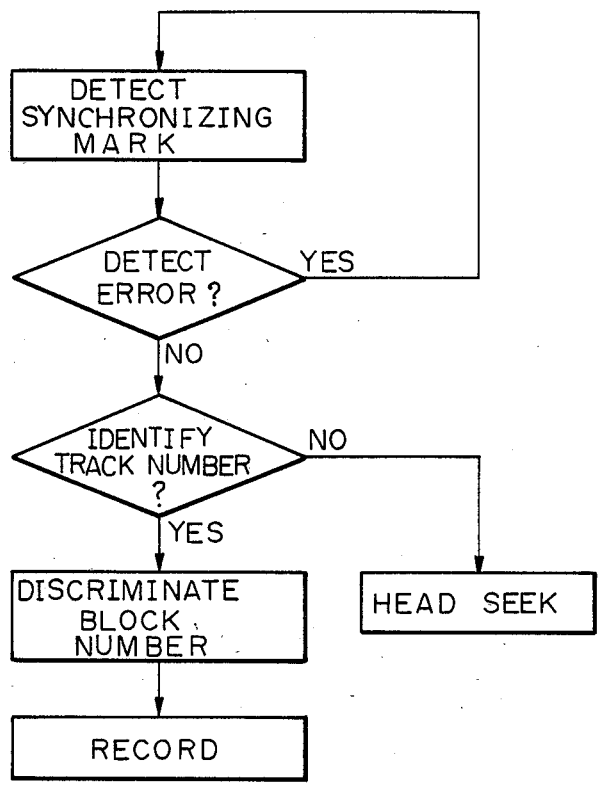
FIG. 3 is a flow chart of a recording method.

FIG. 1 is a fragmentary schematic view showing an embodiment of the information recording medium according to the present invention, which is in the form of a card. In FIG. 1, reference numeral 1 designates the card-like recording medium, reference characters 2a, 2b, 2c, 2d, . . . denote information tracks, reference numeral 3 designates the recording area of the information tracks, and reference numeral 4 denotes (the area other than the) recording area. The area 4 is given track numbers for discriminating between the information tracks. The area 4 shown in FIG. 1 has four information blocks, each of which contains therein at least information indicative of the track number and information from the information block to the recording area.

Referring now to FIG. 2A which shows an embodiment of the information contained in this one information block, letter S designates a synchronizing mark, B# denotes a number indicating what information block this information block is, T# designates a number for discriminating the information track from the other tracks, and E denotes an error detect mark. As shown in FIG. 2B, the various types of information, S, B#, T# and E, are contained in each information block. The synchronizing mark S and the track number T# are identical between the information blocks, while in the block number B#, different information is recorded in each information block corresponding to the positions of the respective information blocks. Correspondingly thereto, the error detect mark also differs. Said block number is indicative of the information from each information block to the recording starting position.

FIG. 3 shows a flow chart for the positioning of the recording start. The recording process of the information recording medium shown in FIG. 1 will now be described with reference to this flow-chart. First, in recording, a recording head accesses to a certain track on the information recording medium, and reproduces the portion of this track in which the information block is contained. The synchronizing mark in the first information block is first detected, and whether there is an error in the subsequent information, for example, whether reading-out is impossible due to injury or dust, is examined. If there is an error in that information block, the subsequent information block is reproduced. If the information in the information block is accurately read, whether that information block is one belonging to a desired track is identified from the track discrimination number of that information block. If the track being reproduced is identified as the desired track, the block number of the information block judged as the desired track is discriminated, and the block number that information block is known. At that point of time, the position of the recording head relative to the recording medium can be accurately confirmed. Thereafter, where the recording medium is, for example, a so-called optical card capable of optical recording and reproduction, the optical card is provided with a clock track for reproducing a clocks as shown in applicant's U.S. patent application Ser. No. 810,747 and therefore, the recording starting position can be accurately found by counting the number of clocks, with the number of clocks generated as by PLL (phase block loop) means being added to the clocks reproduced by this clock track.

Also, in a case where recording is effected with a track divided into several tracks, the first recording position is accurately found and therefore, by counting the number of clocks, recording can be accomplished with a track divided into any desired number of tracks.

Further, by increasing said number of blocks, the detection error resulting from dust or injury can be eliminated and, if the bits for error detection are increased, the possibility of erroneous discrimination can be reduced.

In FIG. 3, when the information block does not belong to a desired information track, the recording head and the recording medium are moved relative to each other until the information block belonging to the desired track is confirmed, whereby head seek operation is performed.

Where it is desired to reproduce information from the recording medium 1 of FIG. 1 on which the information is recorded, reproduction of the recorded information is effected substantially in the same manner as the flow chart of FIG. 3 when reproduction of the portion in which the information block is contained.

Description will now be made of an apparatus for recording and reproducing information by the use of the recording medium 1 shown in FIG. 1.

Figure 4:
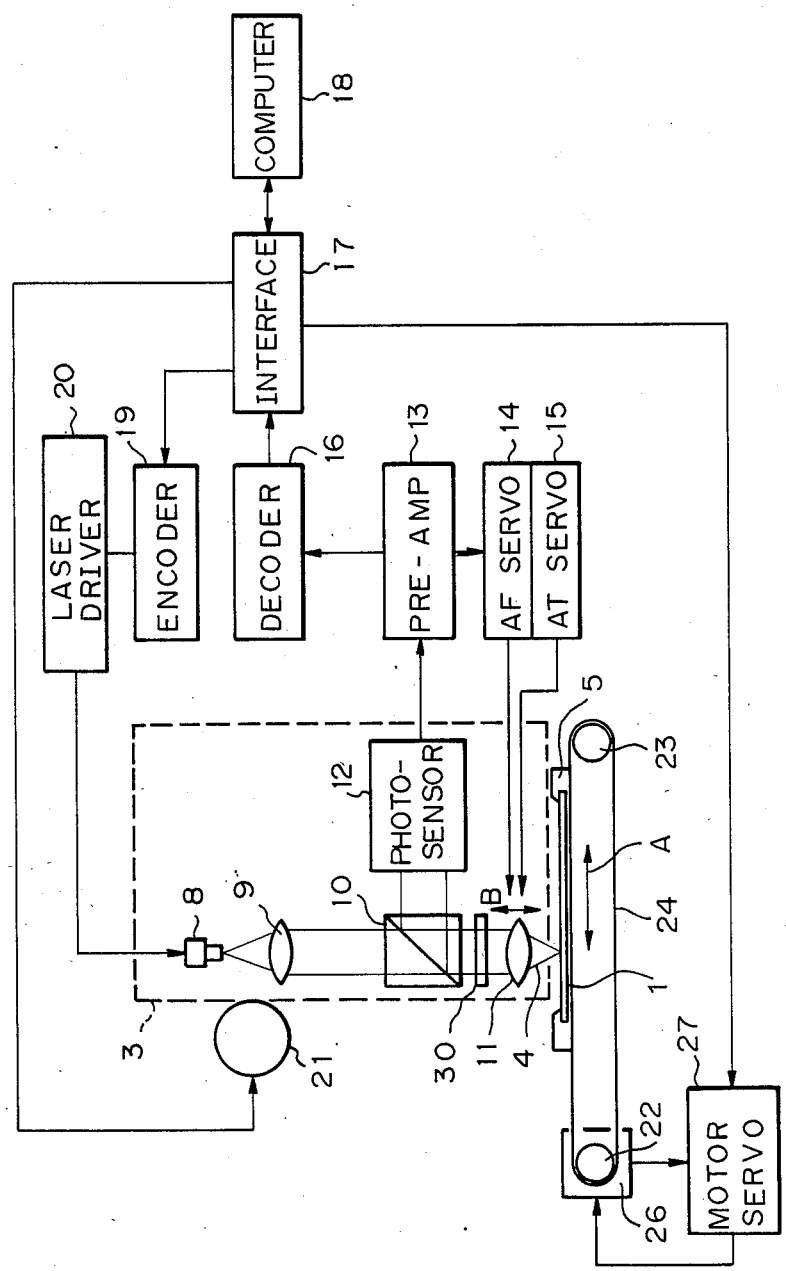
FIG. 4 shows an example of the information recording and/or reproducing apparatus according to the present invention.

In FIG. 4, reference numeral 3 designates an optical head (a portion encircled by a dotted line in FIG. 4), reference numeral 4 denotes a light beam, reference numeral 5 designates a supporting table for supporting the optical card 1 thereon, reference numeral 8 denotes a laser, and reference numeral 9 designates a collimator lens. Reference numeral 10 denotes a polarizing beam splitter, and reference numeral 30 designates a ¼ wavelength plate. By a combination of these two members, the light travelling downward is transmitted, but the light travelling upward is bent in a perpendicular direction. Reference numeral 11 denotes a pick-up lens which serves to condense a parallel light on the optical card 1.

Reference numeral 12 designates a photosensor, reference numeral 13 denotes a pre-amplifier, reference numeral 14 designates an auto-focusing (AF) servo, reference numeral 15 denotes an auto-tracking (AT) servo, reference numeral 16 designates a decoder, reference numeral 18 designates a computer, reference numeral 19 denotes an encoder, reference numeral 20 designates a laser driver, and reference numeral 21 denotes a stepping motor which serves to move the optical head 3 in a direction perpendicular to the support table 5.

Reference numerals 22 and 23 designate pulleys over which a belt 24 is passed. The supporting table 5 for supporting and fixing the optical card 1 is mounted on the belt 24. The pulley 22 is mounted on the shaft of a motor 26, and the optical card 1 is reciprocally moved in the directions of bilateral arrow A by the revolution of the motor 26. Reference numeral 27 denotes a motor servo.

Operation of the apparatus shown in FIG. 4 will now be described. Description will first be made of the case of reproduction. In FIG. 4, a laser beam oscillated from the laser 8 is collimated by the collimator lens 9, passes through the polarizing beam splitter 10 and the ¼ wavelength plate 30, is condensed by the pick-up lens 11 and forms a minute spot on the optical card 1. The reflected light from the optical card 1 is modulated depending on whether there is an information pit in the portion irradiated with the minute spot, and this modulated light is again collimated by the pick-up lens 11 and is caused to enter the photosensor 12 by the polarizing beam splitter 10. The photosensor 12 detects any variation in the quantity of modulated light, converts it into an electrical signal and supplies this signal to the pre-amplifier 13.

The minute spot is first formed on an information block belonging to a certain information track, and a signal based on the information thereof is supplied from the photosensor 12 to the pre-amplifier 13. On the basis of this signal, control means comprising the pre-amplifier 13, the decoder 16, the interface 17 and the computer 18 accurately reads out the information of any information block, confirms whether this information block belongs to a desired information track, and if confirmed so, recognizes the reproduction starting position from that information block, and prepares an information signal on the basis of the signal entering the pre-amplifier 13 from the point at which the light from the laser 8 is accurately applied to the reproduction starting position.

When said information block is not the desired information block, the stepping motor 21 is controlled through the interface 17 to effect the head seek operation.

Description will now be made of the case of recording. As in the case of reproduction, if the recording starting position is recognized, the laser driver 20 is controlled through the interface 17 and the encoder 19 so that recording of information is started from the point at which the light from the laser 8 is accurately applied to this recording starting position, thereby modulating the laser 8 on the basis of the recording information.

The head seek operation is performed in a manner similar to that in the case of reproduction.

Description will now be made of an embodiment in which the information blocks are not reproduced during the reproduction of information.

Figure 5:
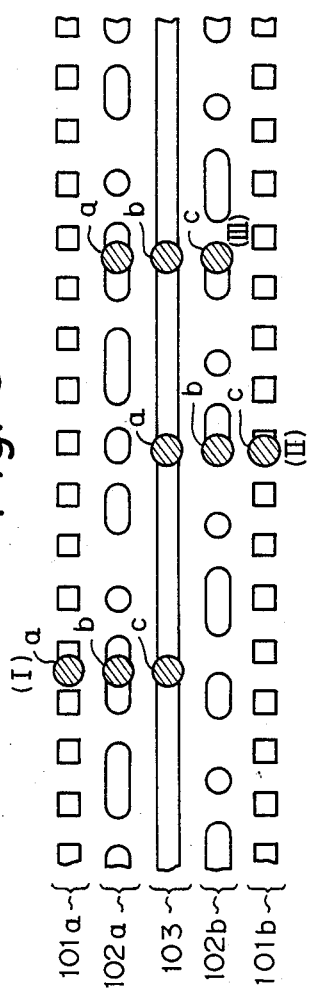
FIG. 5 illustrates another example of the information recording-reproducing method.

FIG. 5 shows an example of the card-like information recording medium. In FIG. 5, reference characters 101a and 101b designate clock tracks, reference characters 102a and 102b denote recording tracks, reference numeral 103 designates a track for tracking, and letters a, b and c denote three light beams divided from a light source.

Where it is desired to record information on the recording track 102a (I in FIG. 5), tracking is taken by the beam c and the recording starting position is detected outside the requisite recording area by the beam a, whereafter recording is effected by the beam b while the clock is reproduced. Also, where it is desired to record information on the recording track 102b (II in FIG. 5), tracking is taken by the beam a and the recording starting position is detected outside the requisite recording area by the beam c, whereafter recording is effected by beam b while the clock is reproduced.

Also, to reproduce the information recorded on the recording tracks 102a and 102b adjacent to the tracking track 103, a method as shown at III in FIG. 5 is adopted. That is, both of the two types of recorded information are reproduced at a time by the beams a and c while tracking is taken by the beam b. That is a method advantageous in that the transfer speed of the information during reproduction can be increased to twice. However, to know the reproduction starting position at this time, it is necessary to detect such position by the beams a and c and the information of the recording starting position pre-recorded on the clock tracks 101a and 101b cannot be used during reproduction.

So, by the use of an information recording medium (corresponding to the optical card in FIG. 1) on which position discriminating information having information indicative of the recording starting position (corresponding to the information regarding the recording starting position contained in the clock tracks 101a and 101b in FIG. 5) was pre-recorded during information recording (I and II in FIG. 5), the same position discriminating information as said position discriminating information (the information taken out may be the same as the position discriminating information and is independent of the shape of the recording pit), together with the recording information, is recorded on the recording tracks 102a and 102b during information recording, and the reproduction starting position is detected by the position discriminating information recorded on the recording tracks 102a and 102b, during reproduction.

Figure 6:
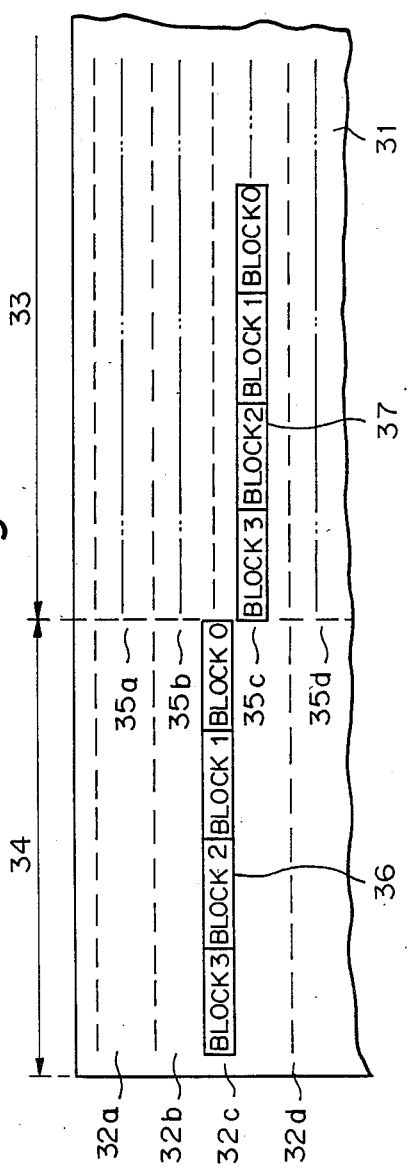
FIG. 6 is a fragmentary view of another example of the information recording medium according to the present invention.

In FIG. 6, reference numeral 31 designates a card-like recording medium, reference characters 32a, 32b, 32c, 32d, ... denote information tracks, reference numeral 33 designates a requisite recording area, and reference numeral 34 denotes the other area than the requisite recording area. The area 34 is given track numbers for discriminating the information tracks. Position discriminating information 36 is provided in the area 34 shown in FIG. 6, and this information 36 has, for example, four information blocks, and at least the information indicative of the track numbers and the information from that information block to the requisite recording area 33 is contained in each information block, as in the example shown in FIG. 2. Reference characters 35a, 35b, 35c, 35d, ... denote recording tracks contained in the information tracks. In the area 33, the same information as the four information blocks of the position discriminating information 36 pre-recorded in the area 34 is recorded prior to the recording information. In FIG. 6, this is represented by position discriminating information 37. Each information block is of the construction as shown, for example, in FIG. 2.

Figure 7:
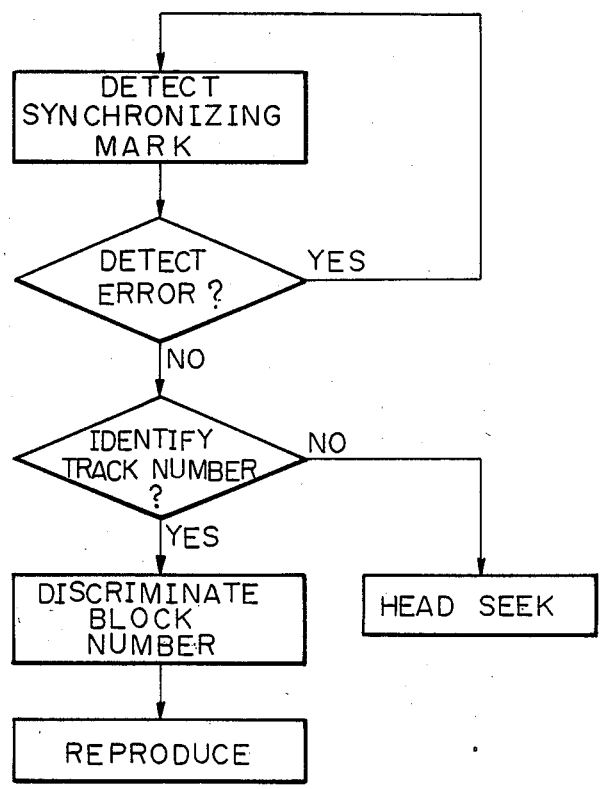
FIG. 7 is a flow chart of a reproducing method.

FIG. 7 shows a flow chart for positioning of the reproduction start. The reproducing process of the information recording medium according to the present invention shown in FIG. 6 will hereinafter be described with reference to this flow chart. First, in reproduction, a reproducing head accesses to a certain recording track on the information recording medium 31, and the portion of this track in which the information blocks are contained is first reproduced. First, the synchronizing mark of the first information block is detected, and whether there is an error in the subsequent information, for example, whether reading-out is impossible because of injury or dust, is examined. If there is an error in that information block, the subsequent information block is reproduced. If the information of the information block is accurately read out, whether that information block belongs to the desired track is confirmed from the track discriminating number of that information track. If the track being reproduced in confirmed as the desired track, the block number of the information block which has judged that it is the desired track is recognized, and what information block that information block is known. At that point of time, the position of the reproducing head relative to the recording medium can be accurately confirmed. Thereafter, the reproduction starting position can be accurately known by counting the number of clocks generated as by PLL means.

Where it is desired to record information on the recording medium 31 of FIG. 6, recording is accomplished by a method similar to the recording method described in connection with FIG. 1, with the exception that the position descriminating information is recorded on the recording track prior to the information recording. The recording-reproducing apparatus is substantially the same as that described in connection with FIG. 4, with the exception of some functional differences.

Description will now be made of a recording method and apparatus in which the position discriminating information is not pre-recorded on the recording medium and during recording, the position discriminating information for information reproduction is recorded on the recording track prior to the recording information.

In this case, if the recording track is recognized, the laser driver 20 of FIG. 4 is controlled so that the position discriminating information and then the recording information may be recorded on the recording track. This position discriminating information is such as shown, for example, in FIG. 2B. The recording apparatus in this case is of such a construction as shown in FIG. 4, and the reproducing method is carried out in a manner similar to what has been previously described.

In the foregoing description, a card-like recording medium has been described, whereas it is apparent that the present invention is applicable not only to a card-like recording medium but also disc-like or other recording medium, and as regards the information recording method, it is also apparent that the present invention is equally applicable to the magnetic method, the optical method and other methods.

We claim:

1. An information recording medium having a plurality of information tracks, each of said information tracks has a recording area for recording information thereon, and a plurality of sets of information, each set including a discrimination mark for discriminating one information track from the other information tracks and contiguously provided in such a manner that said sets of information are in contact with each other, and said plurality of sets of information each further include position information indicative of recording starting position, said position information of each of said plurality of sets of information being different from each other according to their positional relationships with the recording starting position.

2. An information recording medium according to claim 1, wherein said set of information is an information block including a synchronizing mark, a number indicative of the order of said set of information, a number for discriminating the information track on which said set of information is provided from the other information tracks, and an error detect mark.

3. An information recording method for recording information by the use of the information recording medium of claim 1, in which when the information of any set of information is accurately read out, whether that set of information belongs to a desired information track is confirmed and if so confirmed, the recording starting position is recognized from that set of information and recording of information is started from a point at which a recording head has accurately arrived at said recording starting position.

4. An information recording method according to claim 3, wherein when said set of information does not belong to the desired information track, head seek operation is performed until a set of information belonging to the desired track is confirmed.

5. An information recording method according to claim 3, wherein accurate reading-out of any of said sets of information is accomplished by first examining whether it is impossible to read out the first set of information, and if impossible, reading out the subsequent set of information and executing this until accurate reading-out is accomplished.

6. An information reproducing method for reproducing information by the use of the information recording medium of claim 1 on which information is recorded, in which when the information of any set of information is accurately read out, whether that set of information belongs to a desired information track is confirmed, and if so confirmed, the information reproduction starting position is recognized from that set of information and reproduction of the information is started from a point at which a reproducing head has accurately arrived at said information reproduction starting position.

7. An information reproducing method according to claim 6, wherein when said set of information does not belong to the desired information track, head seek operation is performed until a set of information belonging to the desired track is confirmed.

8. An information reproducing method according to claim 6, wherein accurate reading-out of the information of said any set of information is accomplished by first examining whether it is impossible to read out the first set of information, and if impossible, reading out the subsequent set of information and executing this until accurate reading-out is accomplished.

9. An information recording apparatus for recording information by the use of the information recording medium of claim 1, comprising:
   a light source;
   means for applying the light from said light source onto the information recording medium;
   support means for supporting the information recording medium;
   a photosensor;
   means for directing the light from the information recording medium to said photosensor;
   means for modulating said light source on the basis of the information to be recorded; and
   control means for receiving a signal from said photosensor, said control means accurately reading out the information of any set of information on the basis of said signal and confirming whether that set of information belongs to a desired information track, and if so confirmed, recognizing the recording starting position from that set of information and controlling said modulating means so that recording of the information is started from a point at which the light from said light source is accurately applied to the recording starting position.

10. An information recording apparatus according to claim 9, further comprising head seek means and wherein when said set of information does not belong to a desired information track, said control means controls said head seek means to effect head seek operation until a set of information belonging to the desired track is confirmed.

11. An information recording apparatus according to claim 9, wherein said control means accomplishes accurate reading-out of the information of said any set of information by first-examining whether it is impossible to read out the first set of information and if impossible, reading out the subsequent set of information and executing this until accurate reading-out is effected.

12. An information reproducing apparatus for reproducing information recorded on the information recording medium of claim 1, comprising:
   a light source;
   means for applying the light from said light source onto the information recording medium;
   support means for supporting the information recording medium;
   a photosensor;
   means for directing the light from the information recording medium to said photosensor; and
   control means for receiving a signal from said photosensor, said control means accurately reading out the information of any set of information on the basis of said signal and confirming whether that set of information belongs to a desired information track and if so confirmed, recognizing the recorded information reproduction starting position from that set of information, and reproducing an information signal on the basis of said signal from a point at which the light from said light source is accurately applied to said reproduction starting position.

13. An information reproducing apparatus according to claim 12, further comprising head seek means and wherein when said set of information does not belong to a desired information track, said control means controls said head seek means to effect head seek operation until a set of information belonging to the desired track is confirmed.

14. An information reproducing apparatus according to claim 12, wherein said control means accomplishes accurate reading out of the information of said any set of information by first examining whether it is impossible to read out the first set of information and if impossible, reading out the subsequent set of information and executing this until accurate reading-out is effected.

15. An information recording method for recording information on an information recording medium having a plurality of information tracks for recording information thereon, in which during recording a plurality of sets of information each including a discrimination mark for discriminating one information track from the other information tracks are contiguously recorded on each of the information tracks in such a manner that the sets of information are in contact with each other and the plurality of sets of information each further include position information indicative of reproduction starting position for reproducing information recorded after the contiguously recorded sets of information on the information track, the position information of each of the plurality of sets of information being different from each other according to their positional relationships with the reproduction starting position.

16. An information recording method according to claim 15, wherein said set of information is an information block including a synchronizing mark, a number indicative of the order of said set of information, a number for discriminating the information track on which said set of information is provided from the other information tracks, and an error detect mark.

17. An information recording method according to claim 15, wherein a plurality of sets of information each including a discrimination mark for discriminating one information track from the other information tracks and position information indicative of recording starting position are contiguously pre-recorded on said information recording medium in such a manner that said sets of information are in contact with each other, and said plurality of sets of information recorded during said recording are the same as said pre-recorded plurality sets of information and are recorded on a recording track included in said information area.

18. An information recording apparatus for recording information on an information recording medium having a plurality of information tracks, comprising:
   a light source;
   means for applying the light from said light source onto the information recording medium:
   support means for supporting the information recording medium; and
   means for modulating said light source on the basis of the information to be recorded, said modulating means modulating said light source so that on one information track a plurality of sets of information, each of the plurality of sets of information including a discrimination mark for discriminating the one information track from the other information tracks and position information indicative of reproduction starting position for information reproduction, are contiguously recorded in such a manner that the sets of information are in contact with each other, the position information being different from each other according to their positional relationships with the reproduction starting position and the sets of information being recorded before information is recorded in a recording area included in the information track.

19. An information recording apparatus according to claim 18, wherein said set of information is an information block including a synchronizing mark, a number indicative of the order of said set of information, a number for discriminating the information track on which said set of information is provided from the other information tracks, and an error detect mark.

20. An information recording apparatus according to claim 18, wherein a plurality of sets of information including a discrimination mark for discriminating one information track from the other information tracks and information indicative of recording starting position are continuously pre-recorded on the information recording medium, and the plurality of sets of information recorded during the recording are the same as the pre-recorded sets of information and are recorded on a recording area included in the information track.

21. An information reproducing method for reproducing recorded information on an information recording medium on which a plurality of sets of information, each including a discrimination mark for discriminating one information track from the other information tracks and position information indicative of recording starting position, are contiguously pre-recorded in that portion of one of the information tracks which is not to be read out during reproduction and in such a manner that the sets of information are in contact with each other, the position information of each of the plurality of sets of information being different from each other according to their positional relationships with the recording starting position, and on which during recording, together with information to be recorded, the same sets of information as the pre-recorded plurality of sets of information track, are recorded in a recording area included in the information track wherein when the information from any set of information recorded during said recording is accurately read out, whether that set of information belongs to a desired information track is confirmed and if so confirmed, an information reproduction starting position is recognized from that set of information and information reproduction is started from a point at which a reproducing head has accurately arrived at the information reproduction starting position.

22. An information reproducing method according to claim 21, wherein when said set of information does not belong to the desired information track, head seek operation is performed until a set of information belonging to the desired track is confirmed.

23. An information reproducing method according to claim 21, wherein accurate reading-out of the information of said any set of information is accomplished by first examining whether it is impossible to read out the first set of information and if impossible, reading out the subsequent set of information and executing this until accurate reading-out is effected.

24. An information reproducing apparatus for reproducing recorded information on an information recording medium on which a plurality of sets of information, each set of information including a discrimination mark for discriminating one information track from the other information tracks and position information indicative of the recording starting position, said discrimination mark and position information contiguously pre-recorded in that portion of said one information track which is not to be read out during reproduction in such a manner that said sets of information are in contact with each other, each position information being different from each other according to their positional relationships with the recording starting position, and on which during recording, together with information to be recorded, the same sets of information as said pre-recorded plurality of sets of information are recorded on a recording track included in said information track, said apparatus comprising:

a light source;

means for applying the light from said light source onto said recording track of said information recording medium;

support means for supporting the information recording medium;

a photosensor;

means for directing the light from the information recording medium to said photosensor; and control means for receiving the signal from said photosensor, said control means, when the information of any set of information recorded during said recording is accurately read out, confirming on the basis of said signal whether that set of information belongs to a desired information track and if so confirmed, recognizing the information reproduction starting position from that set of information and reproducing starting position from that set of information and reproducing an information signal on the basis of said signal from a point at which the light from said light source is accurately applied to said reproduction starting position.

25. An information recording medium according to claim 1, wherein said plurality of set of information are recorded in that portion of the information track which is not to be read out during reproduction.

26. An information recording medium according to claim 1, wherein recording and reproduction of information is effected by an optical method.

* * * * *

UNITED STATES PATENT AND TRADEMARK OFFICE
CERTIFICATE OF CORRECTION

PATENT NO. : 4,888,753

DATED : December 19, 1989

INVENTOR(S) : Masahiko Enari, et al.

It is certified that error appears in the above-identified patent and that said Letters Patent is hereby corrected as shown below:

COLUMN 2

Line 15, "information recording meidum" should read --information recording medium--.

COLUMN 3

Line 23, "(the area" should read --the area--.
    Line 24, "the)" should read --the--.
    Line 51, "to a" should be deleted.
    Line 65, "number" should read --number of--.

COLUMN 4

Line 5, "a clocks" should read --clocks--.
    Line 9, "PLL (phase block loop)" should read --PLL (phase lock loop)--.

COLUMN 7

Line 3, "in" should read --is--.
    Line 7, "known." should read --is known.--.

COLUMN 9

Line 11, "first-examining" should read --first examining--.

UNITED STATES PATENT AND TRADEMARK OFFICE
CERTIFICATE OF CORRECTION

PATENT NO. : 4,888,753

DATED : December 19, 1989

INVENTOR(S) : Masahiko Enari, et al.

It is certified that error appears in the above-identified patent and that said Letters Patent is hereby corrected as shown below:

COLUMN 10

Line 17, "plurality" should read --plurality of--.
    Line 19, "track included in said information area" should read --area included in said information track--.
    Line 25, "medium:" should read --medium;--.

COLUMN 11

Line 10, "track," should read --tracks,--.
    Line 35, "on which" should read --having--.
    Line 39, "the" should read --a--.

COLUMN 12

Line 35, "set" should read --sets--.

Signed and Sealed this

Thirteenth Day of July, 1993

Attest:

MICHAEL K. KIRK

Attesting Officer      Acting Commissioner of Patents and Trademarks